United States Patent

Scholz

[11] Patent Number: 5,798,729
[45] Date of Patent: Aug. 25, 1998

[54] RADAR APPARATUS

[75] Inventor: John Arthur Scholz, Hengelo, Netherlands

[73] Assignee: Hollandse Signaalapparaten B.V., Hengelo, Netherlands

[21] Appl. No.: 776,699
[22] PCT Filed: Jul. 20, 1995
[86] PCT No.: PCT/EP95/02884
  § 371 Date: Feb. 10, 1997
  § 102(e) Date: Feb. 10, 1997
[87] PCT Pub. No.: WO96/05519
  PCT Pub. Date: Feb. 22, 1996

[30] Foreign Application Priority Data

Aug. 10, 1994 [NL] Netherlands .......................... 9401297

[51] Int. Cl.⁶ .............................. G01S 13/53; G01S 7/292
[52] U.S. Cl. ........................ 342/189; 342/135; 342/145; 342/203
[58] Field of Search .......................... 342/91, 132, 135, 342/145, 162, 189, 202, 203

[56] References Cited

U.S. PATENT DOCUMENTS

| Re. 33,816 | 2/1992 | Nagasaki et al. | 128/660.07 |
| 3,858,208 | 12/1974 | Parke et al. | 342/88 |
| 4,700,327 | 10/1987 | Hilton | 364/900 |
| 5,539,407 | 7/1996 | Scholz | 342/17 |
| 5,668,828 | 9/1997 | Sanderford, Jr. et al. | 375/202 |

*Primary Examiner*—John B. Sotomayor
*Attorney, Agent, or Firm*—Oblon, Spivak, McClelland, Maier & Neustadt, P.C.

[57] ABSTRACT

A radar apparatus provided with a transmitting unit, antenna unit and a receiver unit. The transmitting unit transmits pulses having a modulation for enabling pulse compression on reception. As an ECCM feature, the radar apparatus is further provided with a blanking circuit. The blanking circuit includes two filters, one filter being responsive to the first half of the transmitting pulse only and the other filter being responsive to the second half of the transmitting pulse only. Blanking occurs if both filters simultaneously produce an output.

20 Claims, 2 Drawing Sheets

RADAR APPARATUS

BACKGROUND OF THE INVENTION

1. Field of the Invention

The invention relates to a pulsed radar apparatus, comprising a transmitter unit for the generation and transmission of transmitter pulses provided with a modulation that enables pulse compression upon reception, a receiver unit for the reception of reflected transmitter pulses, a correlator for compressing the received transmitter pulses, and a blanking circuit for blanking received pulses not provided with the modulation.

The invention furthermore relates to a method for suppressing interference pulses in a radar apparatus.

2. Discussion of the Background

Such a radar apparatus is known from patent application EP-A 0 408 112. In this known radar apparatus the amplitude of a received pulse before the correlator is compared with the amplitude after the correlator. If the pulse during its path through the correlator does not show a significant increase in amplitude, it is assumed to be an interference pulse, as a result of which the blanking circuit is activated.

A drawback of this known radar apparatus is that the interference pulse enters the correlator. A common misconception is that a decorrelator will correctly decorrelate an interference pulse, i.e. a pulse not provided with the correct modulation, in which process the amplitude will decrease to a level that is comparable to the thermal noise level inherent in the radar receiver. Particularly in case of state-of-the-art radar equipment designed for the detection of targets with extremely small radar cross-sections, such as missiles, the detection criteria are refined to such an extent that a decorrelated interference pulse is not acceptable. The decorrelated interference pulse may even entail greater drawbacks than the original interference pulse, because the decorrelation process causes the duration of the pulse to be extended considerably, as a result of which the radar apparatus is eclipsed for a longer period.

SUMMARY OF THE INVENTION

The radar apparatus according to the invention is therefore characterised in that the blanking circuit is provided with means for suppressing the pulses not provided with the modulation before these can enter the correlator.

An advantageous embodiment of the radar apparatus according to the invention is based on the fact that the modulation is accurately known and is characterised in that the means at least comprise a first filter designed for producing a first output signal during a first part of a received transmitter pulse and a second filter designed for producing a second output signal during a second part of a received transmitter pulse, the first part and the second part being at least substantially disjunct, and in that the blanking circuit is activated if the first output signal and the second output signal are produced at least substantially simultaneously.

In case the modulation is a linear chirp, the first filter and the second filter can be advantageously implemented as bandpass filters. This for instance enables the first filter to be tuned to the first half of the linear chirp and the second filter to the second half of the linear chirp. This results in a simple system of filters that is by nature disjunct for the linear chirp.

For comparing the output signals of the first filter and the second filter, the output signals can be advantageously applied to a first and a second modulus-determining element respectively. In case of analogue signals, the obvious solution is to use a detector circuit, well-known in the art. In case of complex digital signals, an equally well-known modulus circuit may be used. If the operations are performed in a computer memory, the modulus is determined on the basis of a number of known arithmetical operations.

Subsequent to the determination of the modulus it is possible, for reducing the susceptibility to short interference peaks, to incorporate a first smoothing filter and a second smoothing filter after the first modulus-determining element and the second modulus-determining element respectively.

A further advantageous embodiment of the radar apparatus according to the invention is characterised in that a threshold circuit is provided, connected to the outputs of the first smoothing filter and the second smoothing filter for determining a parameter that is representative of the degree of overlap and to a threshold value, for activating the blanking circuit if the parameter exceeds the threshold value.

A favourable selection in this respect is a threshold value representing the absolute value of the difference of output signals of the first smoothing filter and the second smoothing filter, passed through a third smoothing filter, and a parameter representing the product of the output signals of the first smoothing filter and the second smoothing filter.

BRIEF DESCRIPTION OF THE DRAWING

The invention will now be explained in greater detail with reference to the following figures, of which.

DISCUSSION OF THE PREFERRED EMBODIMENTS

Figure 1:
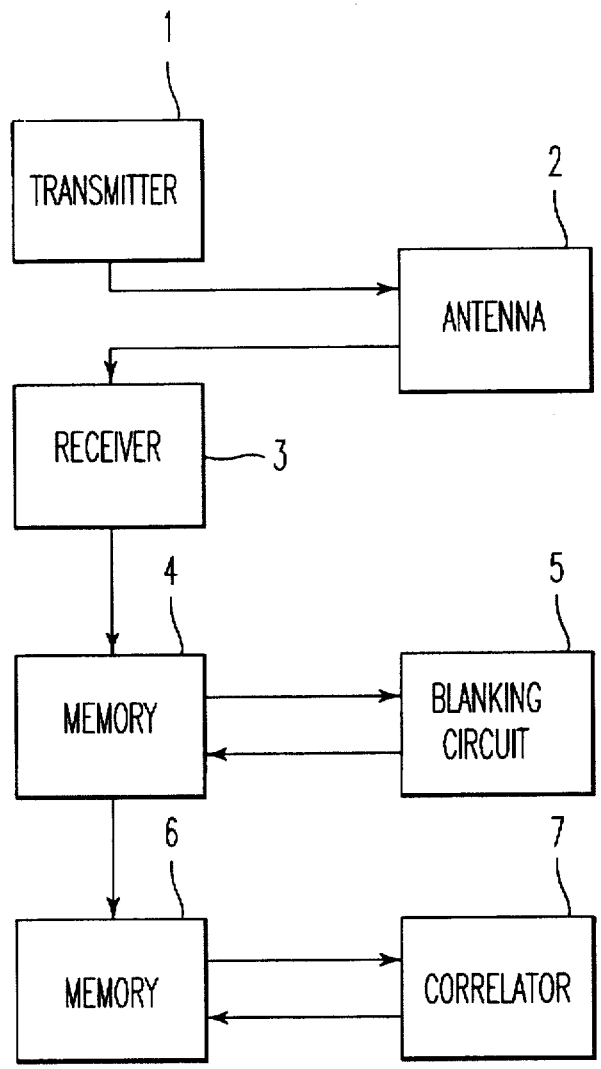
FIG. 1 schematically represents a possible embodiment of the radar apparatus.

FIG. 1 schematically represents a possible embodiment of the radar apparatus according to the invention, whose transmitter unit 1 generates radar pulses which are emitted via antenna unit 2. The radar pulses are provided with a modulation which, upon reception, enables pulse compression via antenna unit 2 and receiver unit 3. To this end, received radar pulses are, preferably digitized, written in a first memory field 4 on which a blanking circuit 5 operates that may be designed as one or a plurality of suitably programmed DSPs (digital signal processors). The blanking circuit 5 removes interference pulses from the first memory field 4 or provides these pulses with a label. The thus preprocessed contents of first memory field 4 are subsequently passed on to a second memory field 6, upon which a correlator 7 operates, usually also designed as one or more suitably programmed DSPs which compresses the received radar pulses. Pulses provided with a label are not compressed however. Correlator 7 compresses the pulses in the second memory field 6 but labelled pulses are not compressed. The contents of the thus processed memory field 6 are subsequently available for further processing.

The first memory field 4 and the second memory field 6 can of course also coincide, resulting in a combined field in which new information is continuously written in a cyclic manner and upon which blanking circuit 5 and correlator 7 also cyclically operate.

Figure 2:
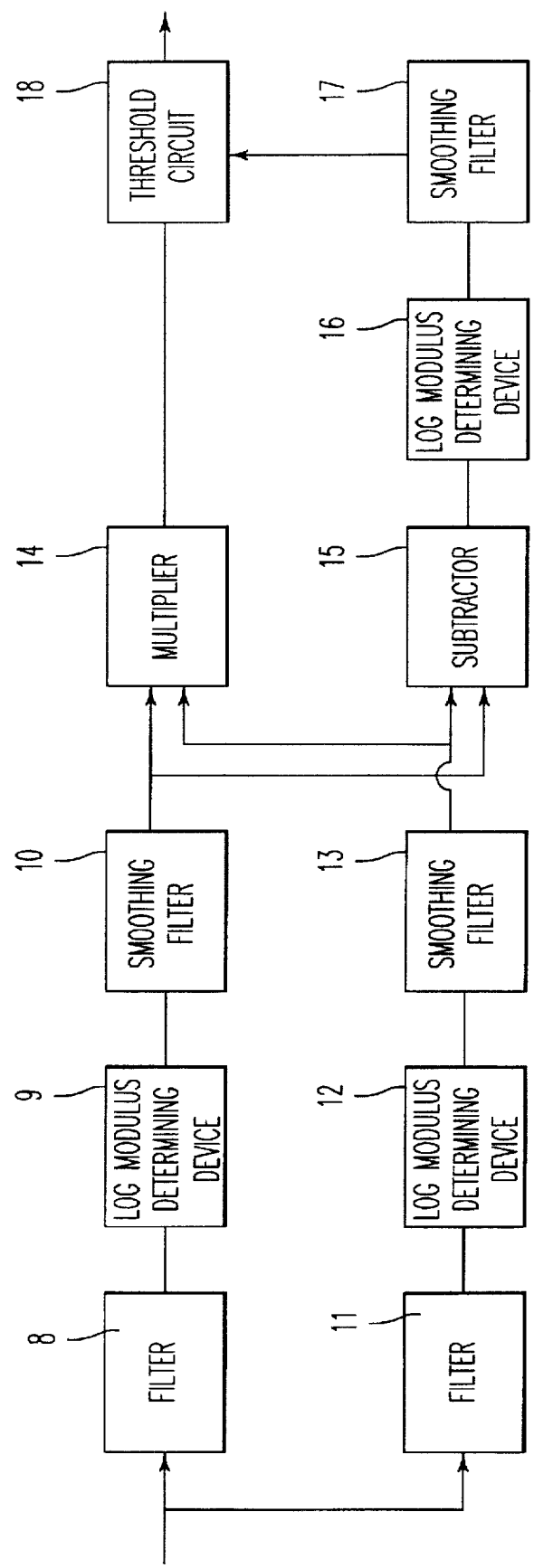
FIG. 2 schematically represents a possible embodiment of the blanking circuit.

FIG. 2 schematically represents a possible embodiment of the blanking circuit. Received pulses are applied to a first filter 8, followed by a first modulus or logmodulus-determining element 9 and a first smoothing filter 10, and to a second filter 11, followed by a second modulus or logmodulus-determining element 12 and a second smoothing filter 13. The first filter 8 produces, for a radar pulse, only an output signal during the first half of the radar pulse. If the radar pulse is for instance modulated with a linear chirp, both filters may be designed as digital bandpass filters, tuned to the first and the second part of the chirp respectively. It is essential, at least for the radar pulse modulated in the known manner, to prevent both output signals from coinciding. Interference pulses, and deliberate interference signals in particular, are often provided with a modulation which, as regards bandwidth and pulselength, to a significant extent corresponds to that pertaining to the radar pulse, the bandwidth being realised by providing the interference pulse with a random modulation. Such an interference pulse will usually generate an output signal for both filters simultaneously, which enables the identification and subsequent blanking of the interference pulse. According to a possible embodiment of the invention, two values are derived from smoothing filters 10 and 13: a parameter that represents the degree of overlap between the two output signals and a threshold value. The parameter is obtained by multiplying in multiplier 14 the output signals of smoothing filters 10 and 13. It will be entirely clear that this parameter is proportional to the overlap and the two signal strengths. A suitable threshold value is obtained by determining in subtractor 15 the difference of the output signals of the two smoothing filters 10 and 13, by determining the absolute value of this difference in modulus-determining element 16 and by subsequently smoothing this value in smoothing filter 17. The actual thresholding operation is then effected in threshold circuit 18, which generates a blanking signal as soon as the parameter crosses the threshold.

The overall blanking circuit may, as stated above, be realised as one or a plurality of suitably programmed DSPs, in which the filters 8 and 11, the modulus or logmodulus-determining elements 9, 12 and 16, the smoothing filters 10, 13 and 17, the multiplier 14, the subtractor 15 and threshold element 18 are incorporated in software, operating on the first memory field 4. Another possibility is to implement the blanking circuit 5 as a hardware component, also operating on memory field 4. It is even possible to implement the blanking circuit 5 in analog hardware in which case an analog intermediate frequency signal is directly fed to blanking circuit 5 without the intervention of the first intermediate memory 4. The filters 8 and 11 will then be implemented as analog bandpass filters, for instance of the SAW type, the modulus-determining elements 9, 12 and 16 as rectifiers, the smoothing filters 10, 13 and 17 as smoothing capacitors, analog multiplier 14 and analog subtractor 15 being known in the art. Threshold element 18 will in that case control a switch to prevent the intermediate frequency signal, possibly delayed in order to compensate for processing delays in blanking circuit 5, from entering the correlator 7. This also renders the use of a second memory field 6 unnecessary.

Although the invention has been explained with reference to a transmitter pulse modulated with a linear chirp, other modulation types may also be considered, such as binary phase-coded transmitter pulses. The first filter can then for instance be designed as a first subcorrelator for correlation with the first half of the transmitter pulse and the second filter as a second subcorrelator for correlation with the second half of the transmitter pulse. The threshold circuit will also depend on the selected transmitter pulse. For the phase-coded transmitter pulse, a threshold circuit will for instance be selected that will activate the blanking circuit only if, after a correlation peak from the first subcorrelator, a comparable correlation peak from the second subcorrelator appears within a certain time window.

In conclusion, consideration may be given to the possibility of testing the transmitter pulse using more than two filters and of subsequently analysing the output signals of these more than two filters such that only transmitter pulses originating from the radar apparatus are allowed to pass for further processing.

I claim:

1. A pulsed radar apparatus, comprising:

a transmitter configured to generate and transmit transmitter pulses with a predetermined modulation so as to enable pulse compression upon reception of said transmitter pulses;

a receiver configured to receive pulses, including said transmitter pulses and other pulses that have not been modulated with said predetermined modulation, and output received pulses that include received transmitter pulses and received other pulses;

a blanking circuit configured to blank the received other pulses; and a correlator configured to compress said received transmitter pulses, wherein said blanking circuit includes means for suppressing said received other pulses before being applied to said correlator.

2. The radar apparatus of claim 1, wherein:

said means for suppressing includes, a first filter configured to produce a first output signal in response to processing a first part of the received pulses, and a second filter configured to produce a second output signal in response to processing a second part of respective of the received pulses, respective first parts and second parts the received transmitter pulses being substantially disjunct, wherein said blanking circuit being configured to blank a subject pulse of said received pulses if said first output signal and said second output signal are produced at least partially simultaneously.

3. The apparatus of claim 2, wherein:

said first filter and said second filter are bandpass filters; and said predetermined modulation is a linear chirp.

4. The apparatus of claim 3, wherein:

said first filter is configured to pass a first half of the linear chirp; and said second filter is configured to pass a second half of the linear chirp.

5. The radar apparatus of claim 4, further comprising:

a first modulus-determining element and a first smoothing filter, being connected to the first filter; and a second modulus-determining element and second smoothing filter, being connected to the second filter.

6. The radar apparatus of claim 5, farther comprising:

a threshold circuit connected to respective outputs of the first smoothing filter and the second smoothing filter, and configured to, determine a parameter that is representative of a degree of overlap of respective outputs of the first smoothing filter and the second smoothing filter, and provide a threshold value that when compared with said parameter determines whether said blanking circuit will blank the subject pulse.

7. The radar apparatus of claim 6, wherein:

said threshold value being representative of an absolute value of a difference of respective output signals of the first smoothing filter and the second smoothing filter, after having passed through a third smoothing filter.

8. The radar apparatus as claimed in claim 6, wherein said parameter is representative of a product of respective output signals of the first smoothing filter and the second smoothing filter.

9. The radar apparatus as claimed in claim 7, wherein said parameter is representative of a product of respective output signals of the first smoothing filter and the second smoothing filter.

10. The apparatus of claim 2, further comprising:

a first modulus-determining element and a first smoothing filter, being connected to the first filter; and a second modulus-determining element and second smoothing filter, being connected to the second filter.

11. The apparatus of claim 10, further comprising:

a threshold circuit connected to respective outputs of the first smoothing filter and the second smoothing filter, and configured to,
  determine a parameter that is representative of a degree of overlap of respective outputs of the first smoothing filter and the second smoothing filter, and
  provide a threshold value that when compared with said parameter determines whether said blanking circuit will blank the subject pulse.

12. The apparatus of claim 11, wherein:

said threshold value being representative of an absolute value of a difference of respective output signals of the first smoothing filter and the second smoothing filter, after having passed through a third smoothing filter.

13. The radar apparatus of claim 11, wherein:

said parameter being representative of a product of respective output signals of the first smoothing filter and the second smoothing filter.

14. The radar apparatus of claim 3, further comprising:

a first modulus-determining element and a first smoothing filter, being connected to the first filter; and a second modulus-determining element and second smoothing filter, being connected to the second filter.

15. The radar apparatus of claim 14, further comprising:

a threshold circuit connected to respective outputs of the first smoothing filter and the second smoothing filter, and configured to,
  determine a parameter that is representative of a degree of overlap of respective outputs of the first smoothing filter and the second smoothing filter, and
  provide a threshold value that when compared with said parameter determines whether said blanking circuit will blank the subject pulse.

16. The radar apparatus as claimed in claim 15, wherein:

said threshold value being representative of an absolute value of a difference of respective output signals of the first smoothing filter and the second smoothing filter, after having passed through a third smoothing filter.

17. The apparatus of claim 16, wherein:

said parameter being representative of a product of respective output signals of the first smoothing filter and the second smoothing filter.

18. The radar apparatus of claim 1, further comprising:

a signal processing device;

a memory device; and an analog to digital converter that converts said received pulses into digital samples that are then stored in the memory device, wherein respective of the filters, and means for suppressing are realized by arithmetical operations performed by the signal processing device on the digital samples stored in the memory device.

19. A method for blanking interfering pulses in a pulsed radar apparatus in which a transmitter unit generates and emits transmitter pulses according to a predetermined modulation, comprising the steps of:

receiving received pulses which include the transmitter pulses and other pulses not modulated with said predetermined modulation;

distinguishing said transmitter pulses from said other pulses;

blanking said other pulses after having distinguished said other pulses in said distinguishing step; and correlating said received pulses after having blanked said other pulses in said blanking step.

20. The method of claim 19, wherein:

said distinguishing step includes,
  generating a first output signal during a first part of a received pulse,
  generating a second output signal during a second part of the received pulse, and
  determining whether the first output signal and the second output signal at least partially coincide with one another, wherein said respective first and second parts of respective of the transmitter pulses are disjunct due to said transmitter pulses being modulated with said predetermined modulation; and suppressing the received pulse if in said determining step it is determined that the first output signal and the second output signal at least partially coincide with one another.

* * * * *